MOUNTING OF MULTI-CHANNEL MAGNETIC TRANSDUCER HEADS

Filed Oct. 5, 1956 2 Sheets-Sheet 1

INVENTORS.
SAMUEL LUBKIN
LEON R. MOCK
TARIK M. RASDAL

BY Jesse A. Holton
ATTORNEY

MOUNTING OF MULTI-CHANNEL MAGNETIC TRANSDUCER HEADS

Filed Oct. 5, 1956 2 Sheets-Sheet 2

INVENTORS.
SAMUEL LUBKIN
LEON R. MOCK
TARIK M. RASDAL
BY
Jesse A. Holton
ATTORNEY 2,998,292
Patented Aug. 29, 1961

2,998,292

MOUNTING OF MULTI-CHANNEL MAGNETIC TRANSDUCER HEADS

Samuel Lubkin, Bayside, Leon R. Mock, Glen Cove, and Tarik M. Rasdal, New York, N.Y., assignors, by mesne assignments, to Curtiss-Wright Corporation, Carlstadt, N.J., a corporation of Delaware Filed Oct. 5, 1956, Ser. No. 614,274
2 Claims. (Cl. 346—74)

This invention relates to the support or mounting of a reproducing or recording head for magnetic records such as drums, tapes or discs, such heads being called "transducer" heads. More particularly this invention is concerned with structures for firmly but adjustably mounting such heads with respect to a record track or channel, and especially where each head comprises many electromagnetic elements or poles for serving a multiplicity of channels or track positions on the record.

One object of the invention is to provide a multichannel head mounting which permits full use of the magnetic recording area of a recording surface, but without wasting space or material for enclosures or supporting details extending beyond the edges of the recording surface. Compactness and lighter weight may therefore be obtained by this invention, compared to conventional supports.

Another object is to provide a head mounting lending itself to a "building block" unit type of assembly, so that a series of head units may be built up to form a larger unit. This has advantages in production which may require variations of multiples of the basic head unit.

A further object is to provide a head mounting in which the casing for the head may be firmly attached to a fixed supporting surface, although the position of the head casing in the mounting may be adjusted in a direction parallel to the record surface without remaking the head mounting details. This assists in proper location of the head units with respect to selected recording channel areas on the drum or other record.

A benefit of the improved design is found in the fact that, when the head mounting assembly is tightened, or when temperature changes follow the tightening of a head mounting, a head mounted according to this invention will not warp or twist sufficiently to cause malfunctioning of the head as might be tne case with other kinds of mounting.

The invention is particularly advantageous when used on head casings of the split block type; i.e. where each head casing is made of two almost identical parts or blocks which are bolted or otherwise secured together. In this case, the head mounting structure of this invention may assist also in holding the two halves of the head casing firmly against each other.

The above objects and advantages are obtained by locating all of the head mounting structures at the back of the head casing, and by using a dove-tail or double wedge rib as the principal mounting element, with suitable pressure elements bearing against the sloping sides of the rib to draw a back surface or shoulders of the casing into firm contact with a supporting surface. Desired adjustment of the head is made by loosening the pressure elements and then sliding the mounting rib of the head casing lengthwise within a matching guiding groove or recess in the support to a new position.

Other objects and further details of that which is believed to be novel and included in this invention will be clear from the following description and claims, taken with the accompanying drawings in which is illustrated an example of transducing head embodying the present invention and incorporating the improved head mounting structures.

Figure 1:
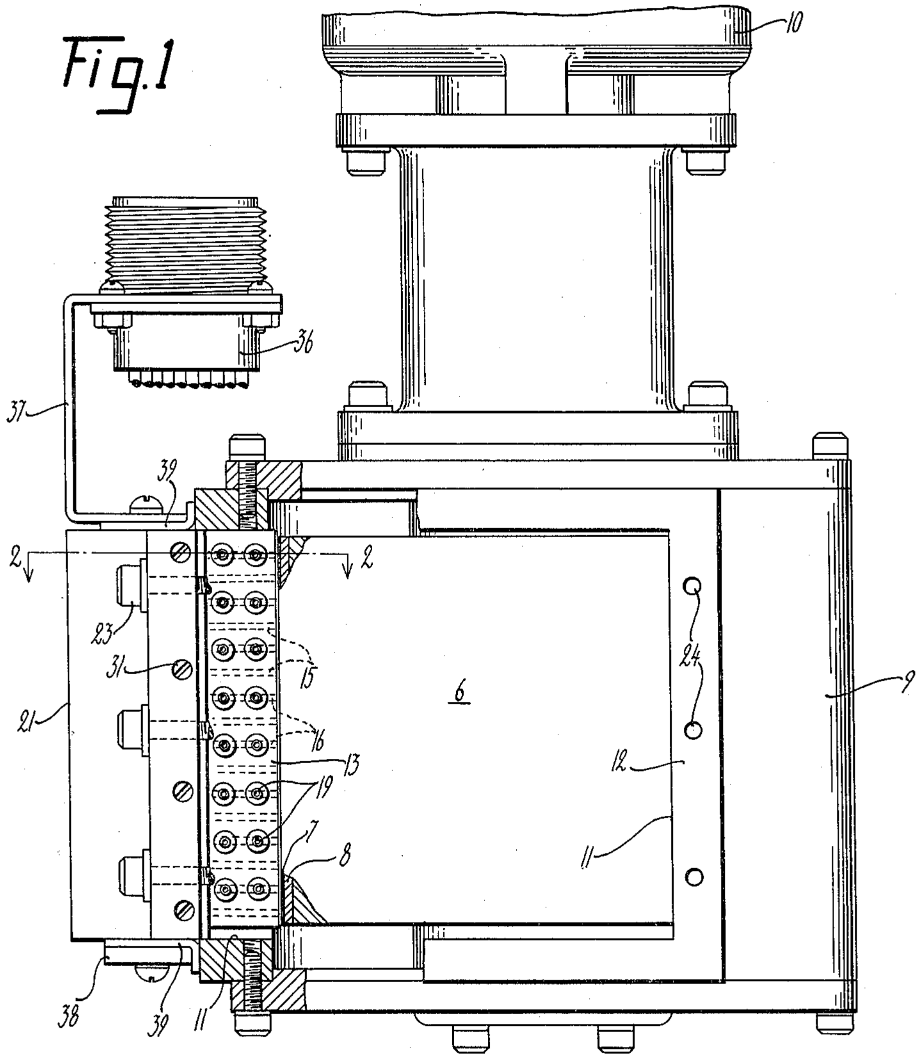
FIGURE 1 is a side elevation view of an assembly of a magnetic record drum with its housing, and a multichannel transducer head mounted to cooperate with the drum, parts of the various elements being broken away for clarity in illustration.
Figures 2, 3:
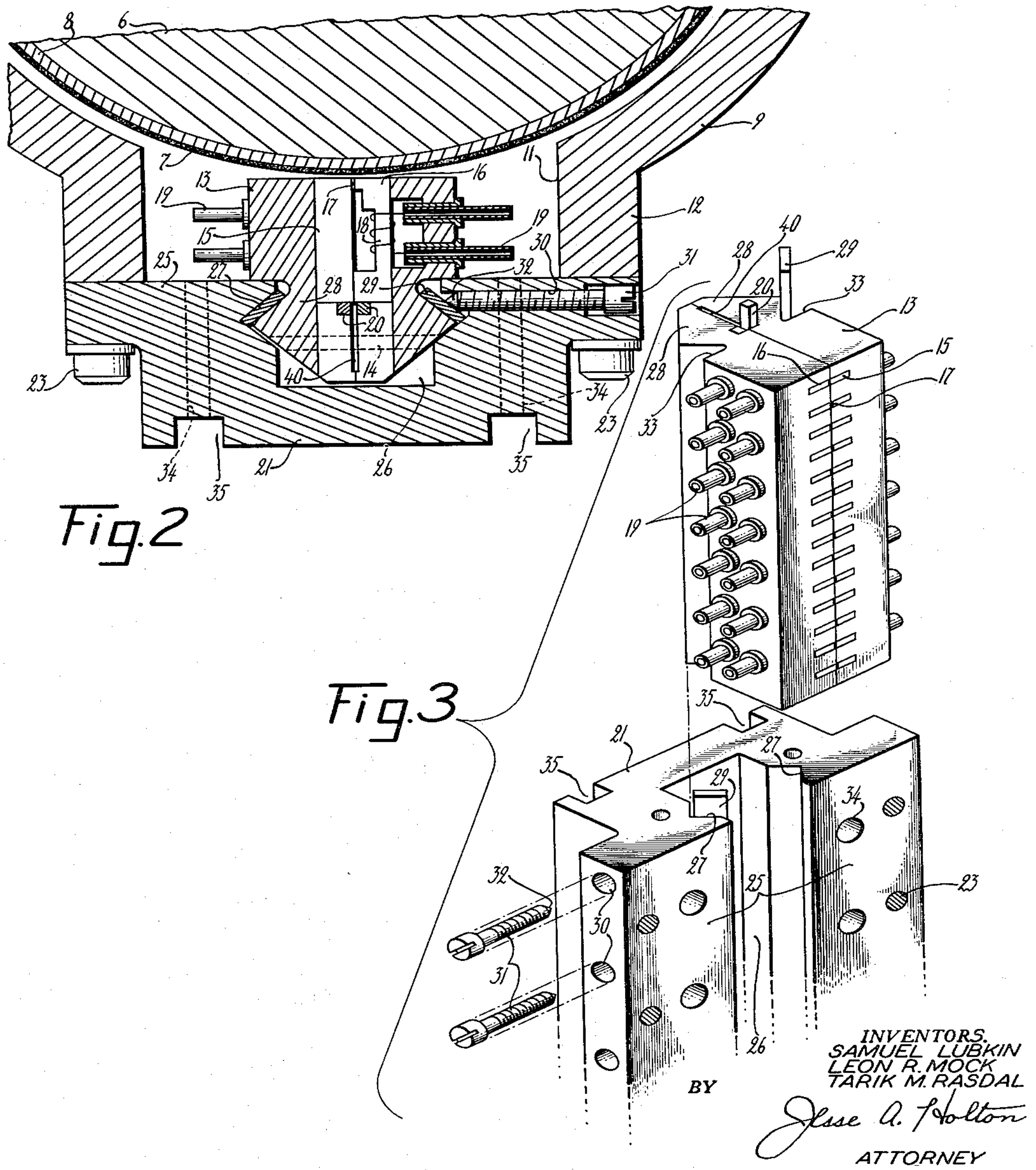
FIGURE 2 is a sectional view on the line and in the direction of the arrows 2—2 of FIGURE 1, enlarged to about twice the scale of that figure.
FIGURE 3 is an exploded perspective view of the transducer head of FIGURES 1 and 2, together with cooperating parts of the head mounting and supporting structure, seen as if looking toward the front or face of the head.

Although the transducer head and mounting of this invention may be used in conjunction with various types of magnetic recording media such as tapes or discs, a cylindrical drum 6 will serve to illustrate the record in the example here disclosed. The drum has on its outer surface a layer 7 of magnetizable material which will carry the magnetic record, and may have another layer 8 shielding the outer magnetic layer from the body of the drum and serving to eliminate irregularities in the drum surface so that a true cylindrical form is obtained.

The drum 6 is mounted on suitable bearings (not shown) to be readily rotatable about its axis within a fixed drum casing or housing 9. A driving motor 10 is connected to the drum shaft to rotate the drum in customary fashion. One or more access ports or openings 11 are provided in the periphery of the housing 9, and these have side walls 12 from which a transducer head casing 13 may be supported by the structures of this invention.

The form of transducer head chosen is not of importance for the purposes of this invention excepting as regards its mounting or supporting structure. However, one design of head casing which has proved successful includes a non-magnetic body built up of two matching blocks or pieces secured together as by pins or rivets 14. A suitable adhesive or cement may also assist in holding the head casing 13 halves against each other and in securing the active magnetic elements within the head casing 13. Note, however, that the pins 14 are placed outside of the casing area which contains the magnetic elements.

The magnetic elements of the head each consist of paired pole pieces 15 and 16 having an active tip 17, or flux gap which cooperates with the magnetic surface on the drum or other record media when the head is properly mounted. At least one of the pole pieces is wound with a coil 18, and lead wires from the coil ends are brought through suitable insulating and shielding tubes 19 to the outside of the head, where they may serve as terminals for proper connection of wires or cables. Pole piece locating bars 20 may be provided for positioning of the pole pieces 15 and 16 within the casing 13.

It will be noted that the head illustrated is a multichannel type, that is, is contains many pole piece pairs or couples, with the tips arranged in a straight line at regular intervals along the length of the face of the head. Each pole tip may be regarded as a separate channel for information to be recorded upon or reproduced from the magnetic drum surface when the drum is rotating. Opposite each pole piece pair, a channel or track on the drum will correspondingly be magnetized or transmit signals to the transducing head, depending upon whether circuit connections are made to the coils 18 for recording or for reproducing purposes.

For supporting the head and head casing 13, a support block or body 21 is secured to the drum housing, as by machine screws 23 threaded into holes 24 which are provided in the walls 12 of the ports 11 of the drum housing. As shown, this head support member may be fixed in a single position with relation to the drum, but if desired, arrangement may be made to afford adjustment of the inner or head supporting surface 25 toward or away from the drum's outer surface.

One form of adjustable mounting is shown and claimed in copending patent application Serial Number 478,833, filed December 30, 1954, of S. Lubkin and L. R. Mock, now Patent No. 2,827,355 dated March 18, 1958.

Whatever the form of support, whether fixed in one position or adjustable between an infinite number of positions toward or away from the drum, it is important that, when once fixed for a desired spacing between the head and drum, the support should maintain the head in that desired spacing under all conditions normally encountered in use.

In order to hold the head casing 13 firmly against the supporting face 25, while at the same time providing free adjustment of the casing in a direction parallel to the drum axis and therefore parallel to the outer drum recording surface, the supporting block 21 has a central groove or way 26 therein, extending from end to end. Side walls of the groove are flared or are slanted outwardly as at 27, to form a sort of a dovetail shaped channel which will slideably receive a similarly wedge shaped rib or projection 28 on the longitudinal center of the back of the head casing 13. Between the slanted walls 27 of the supporting groove 26 and the corresponding slanted surfaces of the wedge shaped projection 28 on the head casing, bearing plates or gibs 29, made of a hard material, are placed. These aid in distributing clamping pressure evenly along the length of the rib 28 and therefore along the entire casing.

To clamp the casing in place firmly, the support block 21 is provided with a series of regularly spaced threaded holes 30 extending from the outside of the block and ending at one of the slanted walls 27 in the groove 26, opposite one of the gibs 29. Clamping screws 31, with bearing tips 32, are threaded into the holes 30 to press the gib plate 29 against the wedge-shaped faces of the rib 28 on the casing, thereby to draw the shoulders 33 on the head firmly against the supporting surface 25 of the block 21. The cooperating slanting surfaces 27 of the groove 26 insure that the clamping action is uniform along the length of the casing, so that twisting or buckling of the casing is prevented. Obviously, sufficient clearance for proper action of the clamping elements is provided between the non-active surfaces of the rib 28 and the bottom surfaces of the groove 26, so that the shoulders 33 may always be drawn snugly against the surface 25 of the support.

If desired, the gibs 29 also may be made wedge shaped in cross-section, although with such an arrangement there may be a tendency for these bearing plates to be forced into a locking position, making it difficult to re-adjust the head when once it has been set.

The dovetail rib 28 may be provided with an internal slot 40, which helps in making assembly of the casing halves easier, because it reduces the area of the matching casing halves which must be carefully fitted together. Other details of the exemplary device which deserve comment are the wiring holes 34 which extend through the supporting block 21 on either side of the casing and end in wiring grooves 35 on the outside of the supporting block. These holes and grooves are used to conduct lead wires from the head terminals 19 to the outside of the assembly, where the wires may be bunched together and placed in a fitting 36, held as by a bracket 37, which may be secured to the head support as shown or in any other desired fashion. The wires are brought from the fitting to a computer or other device (not shown) for controlling recording or reproducing action of the head. Suitable cover plates 38 and dust gaskets 39 may be provided for closing the ends of the groove 26 in the supporting block 21, and other covers, seals, or guards may be added when considered necessary.

Because all of the head casing mounting structures are located in back of and away from the active pole pieces of the head, the full length of the face of the head is useful for transducer gaps cooperating with record channels on the drum. When more than one head is used with a single drum, the channels of each head may therefore be interlaced with and offset from those of another head, thereby gaining the effect of extremely close spacing of record channels—closer than could be obtained in a single head without possible "cross-talk." As a result, much more information may be recorded on a single drum.

In FIGURE 1, note that the head and casing 13 could be shifted downwardly to other positions where the pole tips would be opposite other channel areas on the drum. The port opening 11 is made somewhat longer than the casing 13 to permit this. The lengthwise adjustability of the head and casing 13 without changing the location of screw holes or similar mounting details lends itself to easy interlacing of channels of adjacent heads as explained above.

This form of mounting also affords the opportunity of using more than one head casing in a single mounting structure. For example, instead of a single head unit containing fourteen pole piece pairs, as shown, three head units, each having but four pole piece pairs could be used, or any other combination of heads carrying in all not more than the original fourteen pole pieces. This possibility is realized without re-making the supporting structure each time that a change is desired, and therefore brings about manufacturing economies when small lot orders with various multi-channel requirements or arrangements are encountered. Each order could be built up from standard head casings containing four, six, eight or any other number of pole piece pairs selected as desirable on the basis of experience.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. In magnetic record transducing equipment including a housing, a drum mounted to rotate about its axis within the housing, a cylindrical magnetic record surface on said drum including a multiplicity of parallel information channels thereon, said housing having a port opening therein extending opposite the entire length of the cylindrical record surface parallel to the drum axis, the combination of a longitudinally adjustable mounting for an elongated transducing head, said mounting including a casing for supporting said head, said casing being of a length less than that of the port opening, pole tips spaced along the length of the front face of the head casing adapted to cooperate with said information channels on said record through said port opening, a supporting surface on the back of said casing, a casing support member fixed to said housing across said port, adapted to engage said back supporting surface of the casing, a sloping wall on said support member extending parallel to the drum axis, a similarly sloping face on the back of the casing extending the length of said casing, said sloping wall and sloping face being slideable longitudinally with respect to each other and slanted to draw the back of the casing against the support member when said wall and face are moved toward each other, and means applying clamping pressure for moving said wall and face together, whereby said casing may be secured against said support member at any of various longitudinal positions, with the pole tips opposite various information channels on the drum.

2. A longitudinally adjustable mounting for an elongated multi-channel transducing head usable in combination with a record drum having a multiplicity of parallel information channels thereon, said mounting including a casing for maintaining the transducing head in tangential proximity to said multi-channel record drum, the pole tips of said transducing head being spaced along the length of the front face of the casing to cooperate with said information channels on said record drum, flat back faces on said casing, a fixed casing supporting block with flat walls engageable with said back faces on said casing, a pair of sloping walls on the supporting block, each sloping wall being adjacent one of said flat walls and forming an acute angle therewith, a pair of sloping faces on said casing, each sloping face spaced from and parallel to one of said sloping walls, said casing and sloping faces being slidable longitudinally with respect to said supporting block and within said sloping walls, elongated bearing plates in each space between a sloping wall and a sloping face, and screw means applying clamping pressure against one of said elongated bearing plates for moving said back faces on said casing against said flat walls on said supporting block at various longitudinally adjusted positions.

References Cited in the file of this patent

UNITED STATES PATENTS

| | | |
|---|---|---|
| 1,187,856 | Moss | June 20, 1916 |
| 2,361,752 | Eilenberger | Oct. 31, 1944 |
| 2,423,941 | Laisne | July 15, 1947 |
| 2,441,533 | Montgomery | May 11, 1948 |
| 2,756,280 | Rettinger | July 24, 1956 |
| 2,839,614 | Merrill | June 7, 1958 |
| 2,859,084 | Raddin | Nov. 4, 1958 |

FOREIGN PATENTS

| | | |
|---|---|---|
| 1,028,968 | France | Mar. 4, 1953 |